United States Patent
Jöngren et al.

(10) Patent No.: US 10,581,498 B2
(45) Date of Patent: *Mar. 3, 2020

(54) NETWORK NODE, USER EQUIPMENT AND METHODS THEREIN TO ENABLE THE UE TO DETERMINE A PRECODER CODEBOOK

(71) Applicant: Telefonaktiebolaget LM Ericsson (publ), Stockholm (SE)

(72) Inventors: George Jöngren, Sundbyberg (SE); Sebastian Faxér, Järfälla (SE); Simon Järmyr, Skarpnäck (SE); Niklas Wernersson, Kungsängen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/203,227

(22) Filed: Nov. 28, 2018

(65) Prior Publication Data

US 2019/0097699 A1  Mar. 28, 2019

Related U.S. Application Data

(63) Continuation of application No. 15/513,869, filed as application No. PCT/SE2015/051000 on Sep. 24, 2015, now Pat. No. 10,181,884.

(Continued)

(51) Int. Cl.
*H04B 7/0456* (2017.01)
*H04B 7/06* (2006.01)
*H04L 25/03* (2006.01)

(52) U.S. Cl.
CPC .......... *H04B 7/0469* (2013.01); *H04B 7/046* (2013.01); *H04B 7/0456* (2013.01);
(Continued)

(58) Field of Classification Search
CPC .......... H04B 7/02; H04B 7/04; H04B 7/0404; H04B 7/0408; H04B 7/0413;
(Continued)

(56) References Cited

U.S. PATENT DOCUMENTS

| | | |
|---|---|---|
| 2011/0080969 A1 | 4/2011 | Jongren et al. |
| 2011/0122968 A1 | 5/2011 | Jöngren et al. |

(Continued)

FOREIGN PATENT DOCUMENTS

| | | |
|---|---|---|
| EP | 2755417 A1 | 7/2014 |
| WO | 2011111975 A2 | 9/2011 |
| WO | 2014081357 A1 | 5/2014 |

*Primary Examiner* — Young T Tse
(74) *Attorney, Agent, or Firm* — Murphy, Bilak & Homiller, PLLC

(57) ABSTRACT

A method performed by a base station of enabling a User Equipment (UE) to determine a precoder codebook in a wireless communication system is provided. The base station transmits, to the UE, information regarding precoder parameters enabling the UE to determine the precoder codebook. The precoder parameters are associated with a plurality of antenna ports of the base station. The precoder parameters relate to a first dimension and a second dimension of the precoder codebook. The plurality of antenna ports comprises a number of antenna ports that is a function of a number of antenna ports in the first dimension, and a number of antenna ports in the second dimension.

21 Claims, 12 Drawing Sheets

Related U.S. Application Data

(60) Provisional application No. 62/055,350, filed on Sep. 25, 2014.

(52) U.S. Cl.
CPC ......... *H04B 7/0478* (2013.01); *H04B 7/0617* (2013.01); *H04B 7/0619* (2013.01); *H04B 7/0634* (2013.01); *H04B 7/0658* (2013.01); *H04L 25/0391* (2013.01); *H04L 25/03343* (2013.01); *H04B 7/0486* (2013.01); *H04B 7/0697* (2013.01)

(58) Field of Classification Search
CPC .... H04B 7/0417; H04B 7/0456; H04B 7/046; H04B 7/0469; H04B 7/0478; H04B 7/0486; H04B 7/0608; H04B 7/061; H04B 7/0617; H04B 7/0619; H04B 7/0634; H04B 7/0639; H04B 7/0658; H04B 7/0695; H04B 7/0697; H04B 7/0802; H04B 7/10; H04L 25/03343; H04L 25/0391
USPC ........ 375/259, 260, 262, 265, 267; 370/208, 370/210, 334; 455/517, 63.4, 69
See application file for complete search history.

(56) References Cited

U.S. PATENT DOCUMENTS

| | | |
|---|---|---|
| 2011/0249637 A1 | 10/2011 | Hammarwall et al. |
| 2011/0305263 A1 | 12/2011 | Jongren et al. |
| 2013/0230081 A1 | 9/2013 | Wernersson et al. |
| 2013/0259151 A1 | 10/2013 | Thomas et al. |
| 2013/0308715 A1* | 11/2013 | Nam ..................... H04B 7/0469 375/267 |
| 2014/0016549 A1 | 1/2014 | Novlan et al. |
| 2014/0192762 A1* | 7/2014 | Li ..................... H04L 25/03929 370/329 |
| 2015/0117561 A1 | 4/2015 | Benjebbour et al. |
| 2015/0280798 A1 | 10/2015 | Gao et al. |
| 2015/0358060 A1* | 12/2015 | Park ..................... H04B 7/0473 370/329 |
| 2017/0019159 A1 | 1/2017 | Vook et al. |

* cited by examiner

BASE STATION 110                                    UE 120

501. Send precoder parameters-------------------------->
          .                                      |
          .                        502. Generate precoder codebook
                                   503. Select precoder matrix
          .                                      |
          <----------------------------  504. Send PMI
          |
505. Generate indicated
precoder matrix

Fig. 5

NETWORK NODE, USER EQUIPMENT AND METHODS THEREIN TO ENABLE THE UE TO DETERMINE A PRECODER CODEBOOK

TECHNICAL FIELD

Embodiments herein relate to a network node, a User Equipment (UE), and methods therein enable communication in a wireless communication system. In particular, embodiments herein relate to enabling the UE to determine a precoder codebook to be used in communications with the network node in the wireless communication system. Embodiments herein may further relate to precoder codebook generation and digital beam forming in a wireless communication system. Embodiments herein in particular relate to a network node, a User Equipment (UE), and methods therein to enabling the UE to determine a precoder codebook in the wireless communication system.

BACKGROUND

Multi-antenna techniques can significantly increase the data rates and reliability of a wireless communication system. The performance is particularly improved if both the transmitter and the receiver are equipped with multiple antennas, which results in a multiple-input multiple-output (MIMO) communication channel. Such systems and/or related techniques are commonly referred to as MIMO.

The Long Term Evolution (LTE) communication standard is currently evolving with enhanced MIMO support. A core component in LTE is the support of MIMO antenna deployments and MIMO related techniques. Currently LTE-Advanced supports an 8-layer spatial multiplexing mode for 8 transmit (Tx) antennas with channel dependent precoding. The spatial multiplexing mode is aimed for high data rates in favorable channel conditions. An illustration of the spatial multiplexing operation is shown in FIG. 1. IFFT in FIG. 1 stands for Inverse Fast Fourier Transform and is used for Orthogonal Frequency Division Multiplexing (OFDM).

As seen, the information carrying symbol vector s is multiplied by an $N_T \times r$ precoder matrix W, which serves to distribute the transmit energy in a subspace of the $N_T$-dimensional vector space. The $N_T$-dimensional vector space corresponds to $N_T$ antenna ports. The precoder matrix is typically selected from a codebook of possible precoder matrices, and typically indicated using a precoder matrix indicator (PMI), which specifies a unique precoder matrix in the codebook for a given number of symbol streams. If the precoder matrix is confined to have orthonormal columns, then the design of the codebook of precoder matrices corresponds to a Grassmannian subspace packing problem. The r symbols in s each correspond to a layer and r is referred to as the transmission rank. In this way, spatial multiplexing is achieved, since multiple symbols can be transmitted simultaneously over the same time/frequency resource element (TFRE). The number of symbols r is typically adapted to suit the current channel properties.

LTE uses OFDM in the downlink, and Discrete Fourier Transform (DFT) precoded OFDM in the uplink, and hence, the received $N_R \times 1$ vector $y_n$ for a certain TFRE on subcarrier n (or alternatively data TFRE number n) is modeled by $$y_n = H_n W s_n + e_n$$

where $e_n$ is a noise/interference vector obtained as realizations of a random process. The precoder matrix, W, can be a wideband precoder, which is constant over frequency, or can be frequency selective.

The precoder matrix is often chosen to match the characteristics of the $N_R \times N_T$ MIMO channel matrix H, resulting in so-called channel dependent precoding. This is also commonly referred to as closed-loop precoding and essentially strives for focusing the transmit energy into a subspace which is strong in the sense of conveying much of the transmitted energy to the user equipment (UE). In addition, the precoder matrix may also be selected to strive for orthogonalizing the channel, meaning that after proper linear equalization at the UE, the inter-layer interference is reduced.

In closed-loop precoding for the LTE downlink, the UE transmits, based on channel measurements in the forward link, i.e. the downlink, recommendations to the enhanced NodeB (eNodeB) of a suitable precoder to use. For example, in wideband precoding, a single precoder that is supposed to cover a large bandwidth may be fed back. It may also be beneficial to match the frequency variations of the channel and instead feedback a frequency-selective precoding report, e.g., to report several precoders, one per sub band. This is an example of the more general case of channel state information (CSI) feedback, which also encompasses feeding back other entities than precoders to assist the eNodeB in subsequent transmissions to the UE. Such other information may include channel quality indicators (CQIs) as well as transmission rank indicator (RI).

The transmission rank, and thus the number of spatially multiplexed layers is reflected in the number of columns of the precoder. For efficient performance, it is important that a transmission rank that matches the channel properties is selected.

In the LTE downlink, the UE is reporting CQI and RI and precoders to the eNodeB via a feedback channel. The feedback channel is either on Physical Uplink Control Channel (PUCCH) or on Physical Uplink Shared Channel (PUSCH). The former is a rather narrow bit pipe where CSI feedback is reported in a semi-statically configured and periodic fashion. On the other hand, reporting on PUSCH is dynamically triggered as part of the uplink grant. Thus, the eNodeB can schedule CSI transmissions in a dynamic fashion. In contrast to the PUCCH where the number of physical bits is currently limited to 20, the reports on PUSCH can be considerably larger. Such a division of resources makes sense from the perspective that semi-statically configured resources such as PUCCH cannot adapt to quickly changing traffic conditions, thus making it important to limit their overall resource consumption.

In LTE Rel10, for 8 antenna ports, a factorized precoder structure is used: $= W_1 W_2$. The first precoder, $W_1$, is a wideband precoder targeting long term channel characteristics and the second precoder, $W_2$, is a frequency-selective precoder targeting short term channel characteristics and differences in polarization. A precoder matrix indicator (PMI) for each of the two precoders is supplied by the UE, choosing each precoder from a limited set of available precoders (codebooks). The PMI reporting for each of the two precoders can be configured with different frequency granularity.

The LTE standard implements a variation of the following factorized precoder. The wideband precoder $$W_1 = \begin{bmatrix} X & 0 \\ 0 & X \end{bmatrix}$$

has a block diagonal structure targeting a uniform linear array (ULA) of N cross-polarized antennas, i.e. the number of antenna ports $N_T=2N$. With this structure, the same N×1 precoder X is applied to each of the two polarizations.

The precoder X is a DFT-based precoder, implementing a Grid-of-Beams codebook, supplying the UE with beams pointing at different directions to choose from. The DFT-based codebook has entries $$X^l = \begin{bmatrix} 1 & e^{j2\pi \frac{1l}{NQ}} & \dots & e^{j2\pi \frac{(N-1)l}{NQ}} \end{bmatrix}^T,$$

l=0, ..., NQ−1, where Q is an integer oversampling factor, defining the number of beams available in the codebook.

The DFT-based precoders are tailored to a ULA with a specific number of antenna ports. A separate codebook for each number of supported antenna ports $N_T$ must then be specified. The frequency-selective precoder for rank 1 is defined as $$W_2 = \begin{bmatrix} 1 \\ e^{j\omega} \end{bmatrix}, \text{ where } \omega = \frac{2\pi p}{P},$$

p=0, ..., P−1 and P=4. In this case, the resultant precoder becomes $$W = W_1 W_2 = \begin{bmatrix} X & 0 \\ 0 & X \end{bmatrix} \begin{bmatrix} 1 \\ e^{j\omega} \end{bmatrix} = \begin{bmatrix} X \\ e^{j\omega} X \end{bmatrix}.$$

As seen, $W_2$ targets the phase difference between polarizations. In the LTE standard, the wideband precoder is instead $$W_1 = \begin{bmatrix} \tilde{X}^l & 0 \\ 0 & \tilde{X}^l \end{bmatrix},$$

wherein $\tilde{X}^l = [X^l \dots X^{l+N_b-1}]$, l=0, ..., NQ−1, c consists of several precoders from the DFT-based codebook X. $W_2$ is then extended to be a tall matrix comprising selection vectors which selects one of the precoders in $\tilde{X}^l$ (in addition to changing the phase between polarizations).

A convenient way of extending the DFT-based precoders aimed for ULAs onto two-dimensional antenna arrays is by combining two DFT-based precoders by means of a Kronecker product. The Kronecker product A⊗B between two matrices $$A = \begin{bmatrix} A_{1,1} & \dots & A_{1,M} \\ \vdots & \ddots & \vdots \\ A_{N,1} & \dots & A_{N,M} \end{bmatrix}$$

and B is defined as $$A \otimes B = \begin{bmatrix} A_{1,1}B & \dots & A_{1,M}B \\ \vdots & \ddots & \vdots \\ A_{N,1}B & \dots & A_{N,M}B \end{bmatrix},$$

i.e. the matrix B is multiplied to each of the elements of A. The two-dimensional precoder $X^{N_V k+l}$ is then formed as $$X^{N_V k+l} = X_H^k \otimes X_V^l,$$

where $X_H^k$ is a DFT-based precoder targeting the horizontal dimension, $X_V^l$ is a DFT-based precoder targeting the vertical dimension, and $N_V$ is the number of vertical antenna ports. This has the effect of applying the vertical precoder $X_V^l$ on each column of the antenna array and the horizontal precoder $X_H^k$ on each row of the antenna array.

A problem with existing solutions is that a large amount of overhead is caused by PMI reporting which in turn poses a problem on payload limited feedback channels such as periodic PMI reporting on PUCCH.

SUMMARY

It is therefore an object of embodiments herein to improve the performance of a wireless communication system using precoder codebooks.

According to a first aspect of embodiments herein, the object is achieved by a method performed by a base station of enabling a User Equipment, UE, to determine a precoder codebook in a wireless communication system. The base station transmits to the UE, information regarding precoder parameters enabling the UE to determine the precoder codebook. The precoder parameters are associated with a plurality of antenna ports of the base station. The precoder parameters relate to a first dimension and a second dimension of the precoder codebook. The plurality of antenna ports comprises a number $N_T$ of antenna ports that is a function of a number Nh of antenna ports in the first dimension, and a number Nv of antenna ports in the second dimension.

According to a second aspect of embodiments herein, the object is achieved by a method performed by a User Equipment, UE, of determining a precoder codebook in a wireless communication system. The UE receives from a base station, information regarding precoder parameters enabling the UE to determine the precoder codebook. The precoder parameters are associated with a plurality of antenna ports of the base station. The precoder parameters relate to a first dimension and a second dimension of the precoder codebook. The plurality of antenna ports comprises a number $N_T$ of antenna ports that is a function of a number Nh of antenna ports in the first dimension, and a number Nv of antenna ports in the second dimension. The UE then determines the precoder codebook based on the received information regarding the precoder parameters.

According to a third aspect of embodiments herein, the object is achieved by a base station for enabling a User Equipment, UE, to determine a precoder codebook in a wireless communication system. The base station is configured to transmit to the UE, information regarding precoder parameters enabling the UE to determine the precoder codebook. The precoder parameters are associated with a plurality of antenna ports of the base station. The precoder parameters relate to a first dimension and a second dimension of the precoder codebook. The plurality of antenna ports comprises a number $N_T$ of antenna ports that is a function of a number Nh of antenna ports in the first dimension, and a number Nv of antenna ports in the second dimension.

According to a forth aspect of embodiments herein, the object is achieved by a User Equipment, UE, for determining a precoder codebook in a wireless communication system. The UE is configured to receive from a base station information regarding precoder parameters enabling the UE to determine the precoder codebook. The precoder parameters are associated with a plurality of antenna ports of the base station. The precoder parameters relate to a first dimension and a second dimension of the precoder codebook. The plurality of antenna ports comprises a number $N_T$ of antenna ports that is a function of a number Nh of antenna ports in the first dimension, and a number Nv of antenna ports in the second dimension. The UE is further configured to determine the precoder codebook based on the received information regarding the precoder parameters.

According to a fifth aspect of embodiments herein, the object is achieved by a set of precoder codebooks. At least part of each precoder codebook in the set of precoder codebooks is possible to generate from a set of precoder parameters comprising any one or more of the following combinations of precoder parameters:
 a number Nh of antenna ports in the first dimension and a number Nv of antenna ports in the second dimension, and
 a number Mh of beams available in the first dimension and a number Mv of beams available in the second dimension, and
 an oversampling factor Qh in the first dimension; and an oversampling factor Qv in the second dimension.

At least one precoder parameter in the set of precoder parameters differ between the precoder codebooks comprised in the set of precoder codebooks.

According to a sixth aspect of embodiments herein, the object is achieved by a base station comprising a precoder codebook comprised in the set of precoder codebooks.

According to a seventh aspect of embodiments herein, the object is achieved by a UE comprising a precoder codebook comprised in the set of precoder codebooks.

The UE knows the general structure of the codebook. Together with the codebook parameters, it can then determine the actual precoder codebook. Thus the base station only needs to signal said codebook parameters. This reduces the signaling load compared to if a so called downloadable codebook is used, where the base station signals each entry (which can be arbitrary) of the codebook to the UE, which in turn results in an improved performance of the wireless communication system using precoder codebooks.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein:

FIG. 5 is a timing diagram showing embodiments of a signal and timing flow.

DETAILED DESCRIPTION

Figure 1:
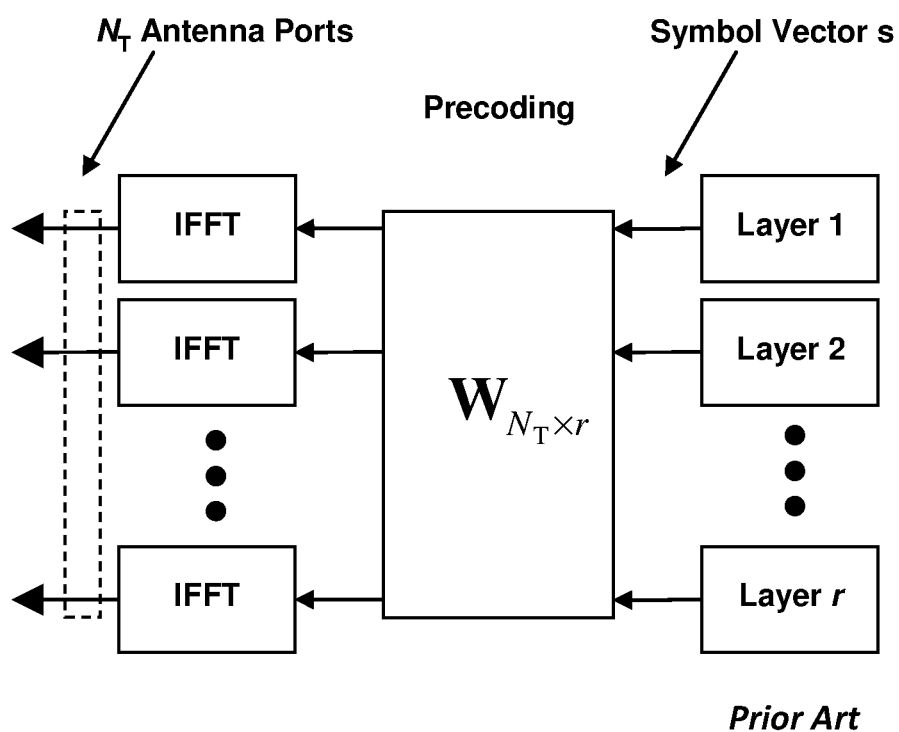
FIG. 1 is a block diagram illustrating an OFDM-based system performing spatial multiplexing according to prior art.

As part of developing embodiments herein, a problem will first be identified and shortly discussed.

Different codebooks are specified for different numbers of antenna ports. However, with a 2D antenna array, each antenna array configuration ($N_h \times N_v$) must have a tailored codebook. Specifying the codebook only by the number of antenna ports creates an ambiguity as different antenna array configurations can have the same number of antenna ports. Specifying a separate codebook for each antenna array configuration would result in a vast number of codebooks, and is infeasible.

Two-dimensional codebooks require $M_v \cdot M_h$ entries to be able to provide $M_h$ beams in a horizontal dimension and $M_v$ beams in a vertical dimension, i.e. it scales quadratic-ly with the number of beams per dimension. This causes a large amount of overhead in PMI reporting which poses a problem on payload limited feedback channels such as periodic PMI reporting on PUCCH.

Differences in correlation properties between horizontal and vertical dimensions may require different time/frequency granularity of precoder choices in each dimension. This is not possible using the aforementioned factorized precoder structure. Also, there is inflexible configuration of per dimension frequency-selective beam selection in $W_2$.

Before describing in detail exemplary embodiments that are in accordance with the present disclosure, it is noted that the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Note that although terminology from 3GPP LTE is used in this disclosure for explanation of certain embodiments, this should not be seen as limiting the scope to only the aforementioned system. Other wireless systems, including Wideband Code Division Multiple Access (WCDMA), WiMax, Ultra Mobile Broadband (UMB) and Global System for Mobile Communications (GSM) systems, may also benefit from exploiting the concepts and functions described herein.

Also note that terminology such as eNodeB and UE are not to be considered as limiting for the disclosure and does not imply a certain hierarchical relation between the two; in general "eNodeB" could be considered as device 1 and "UE" device 2, and these two devices communicate with each other over some radio channel. Also, although embodiments discussed herein focus on wireless transmissions in the downlink, it is understood that implementation is equally applicable in the uplink.

As used herein, relational terms, such as "first" and "second," "top" and "bottom," and the like, may be used solely to distinguish one entity or element from another entity or element without necessarily requiring or implying any physical or logical relationship or order between such entities or elements.

Figure 2:
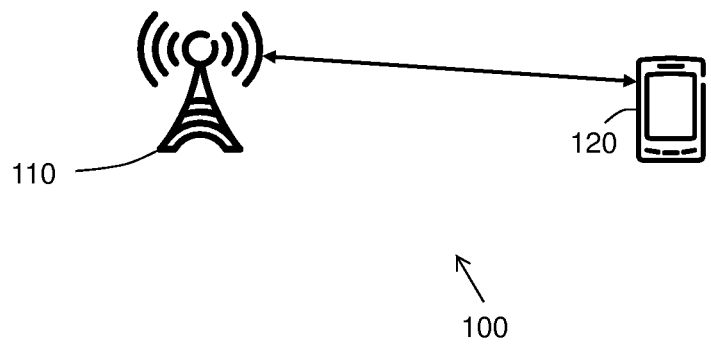
FIG. 2 is a block diagram depicting embodiments of a wireless communication system.

FIG. 2 depicts a wireless communication system 100 in which embodiments herein may be implemented. The wireless communication system 100 may be any network or system using radio communication, such as a GSM system, an LTE system, a WCDMA system, a Fifth Generation (5G) system, a Wimax system, an Ultra Mobile Broadband (UMB) system or any other radio network or system. The wireless communication system 100 e.g. comprises a core network and a radio access network.

A plurality of network nodes operate in the wireless communication system 100, whereof only one, a base station 110, is depicted in FIG. 2 for simplicity. The base station 110 may be referred to as a transmission point and may in some examples be an eNodeB (eNB), a NodeB, a Base Transceiver Station (BTS), an Access Point (AP) or a Home NodeB or Home eNodeB depending on the technology and terminology used, or any other network node capable to communicate with a user equipment with wireless capability, or any other radio network unit capable to communicate over a radio link in a wireless communications network.

A number of UEs operate in the wireless communication system 100. In the example scenario of FIG. 2, only one UE is shown for simplicity, a UE 120 which is served by the base station 110. The UE 120, may e.g. be a mobile or wireless terminal, a mobile phone, a computer such as e.g. a laptop, or tablet computer, sometimes referred to as a surf plate, with wireless capabilities, or any other radio network unit capable to communicate over a radio link in a wireless communications network. Please note the term user equipment used in this document also covers other wireless terminals such as Machine to Machine (M2M) devices.

Figure 3:
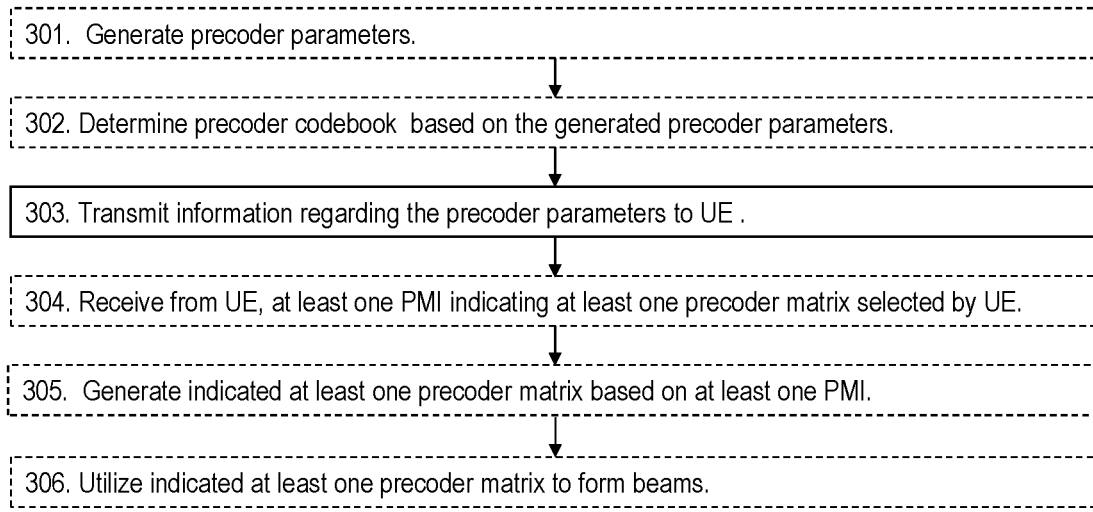
FIG. 3 is a flowchart depicting embodiments of a method in a base station.
Figure 4:
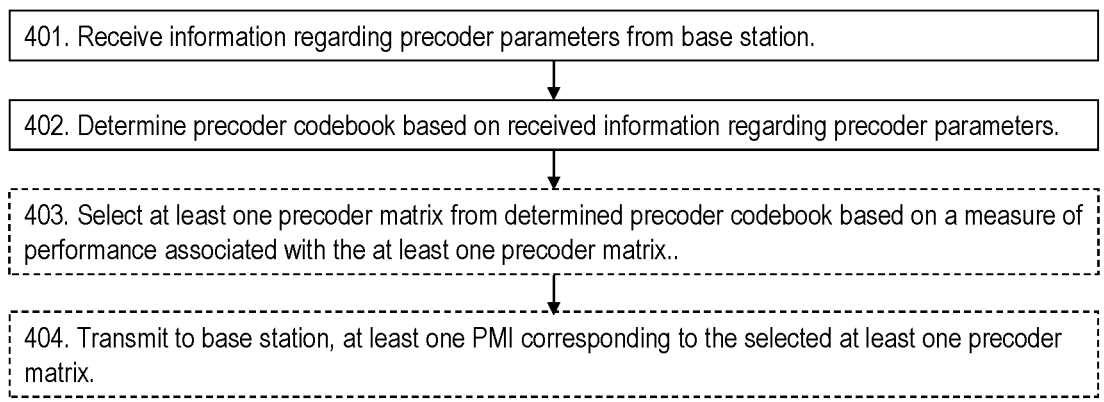
FIG. 4 is a flowchart depicting embodiments of a method in a user equipment.

Embodiments of a method as seen in the view of the base station 110 depicted in a flowchart in FIG. 3, and embodiments of a method as seen in the view of the UE 120 depicted in a flowchart in FIG. 4, will first be described in a general way. These embodiments will be exemplified and described more in detail below.

Example embodiments of the method performed by the base station 110 of enabling a UE 120 to determine a precoder codebook in a wireless communication system will now be described with reference to a flowchart depicted in FIG. 3.

The method comprises the following actions, which actions may be taken in any suitable order. Dashed lines of some boxes in FIG. 3 indicate that this action is not mandatory.

Action 301

In some embodiments, the base station 110 generates precoder parameters associated with a plurality of antenna ports of the base station 110. The precoder parameters relate to a first dimension and a second dimension of the precoder codebook. The first and second dimensions of the precoder codebook matches a two-dimensional distribution of the plurality of antenna ports. The plurality of antenna ports comprises a number $N_T$ of antenna ports that is a function of the number Nh of antenna ports in the first dimension and the number Nv of antenna ports in the second dimension. The precoder parameters may comprise a parameter that specifies a number Nh of antenna ports in the first dimension and a parameter that specifies a number Nv of antenna ports in the second dimension.

In some embodiments, one of the numbers Nv and Nh of antenna ports is equal to one.

In some embodiments, the number of antenna ports $N_T$ is equal to Nh*Nv*Np, where Np represents a number of different polarizations. The number Np of different polarizations may be seen to correspond to a further dimension, in addition to the first and second dimensions.

The precoder parameters may further comprise a parameter that specifies a number Mh of beams available in the first dimension; and a parameter that specifies a number Mv of beams available in the second dimension.

The numbers Mh and Mv of beams may be dependent on corresponding oversampling factors Qh and Qv, respectively. The dependence may be such that Mh=Nh*Qh and Mv=Nv*Qv.

Action 302

The base station 110 may determine the precoder codebook based on the precoder parameters generated in Action 301.

A precoder in the precoder codebook may be constructed or generated by combining a precoder matrix in the first dimension and a precoder matrix in the second dimension in a way equivalent to using a Kronecker product.

Action 303

The base station 110 transmits to the UE 120, information regarding the precoder parameters enabling the UE 120 to determine the precoder codebook. The precoder parameters are associated with a plurality of antenna ports of the base station 110. As in Action 301, the precoder parameters relate to a first dimension and a second dimension of the precoder codebook, and the plurality of antenna ports comprises a number $N_T$ of antenna ports that is a function of a number Nh of antenna ports in the first dimension, and a number Nv of antenna ports in the second dimension.

As mentioned in Action 301, the precoder parameters may comprise a parameter that specifies the number Nh of antenna ports in the first dimension, and a parameter that specifies the number Nv of antenna ports in the second dimension.

In some embodiments the precoder parameters specify at least one of the following parameter combinations:

the number Nh of antenna ports in the first dimension and the number Nv of antenna ports in the second dimension, a number Mh of beams available in the first dimension and a number Mv of beams available in the second dimension, and an oversampling factor Qh in the first dimension; and an oversampling factor Qv in the second dimension.

Action 304

In some embodiments, the base station 110 receives from the UE 120, at least one PMI indicating at least one precoder matrix selected by the UE 120.

The at least one PMI may comprise a first precoder matrix indicator that indicates a first precoder matrix associated with the first dimension; and a second precoder matrix indicator that indicates a second precoder matrix associated with the second dimension.

Action 305

The base station 110 may generate the indicated at least one precoder matrix based on the at least one PMI. This will be described below.

Action 306

The base station 110 may then utilize the indicated at least one precoder matrix to form beams for transmission to the UE 120.

Example embodiments of a method performed by the UE 120 of determining a precoder codebook in a wireless communication system will now be described with reference to a flowchart depicted in FIG. 4.

The method comprises the following actions, which actions may be taken in any suitable order. Dashed lines of some boxes in FIG. 4 indicate that this action is not mandatory.

Action 401

The UE 120 receives from the base station 110 information regarding precoder parameters enabling the UE 120 to determine the precoder codebook. The precoder parameters are associated with a plurality of antenna ports of the base station 110. The precoder parameters relate to a first dimension and a second dimension of the precoder codebook. The plurality of antenna ports comprises a number $N_T$ of antenna ports that is a function of a number Nh of antenna ports in the first dimension, and a number Nv of antenna ports in the second dimension.

In some embodiments, the precoder parameters comprise: a parameter that specifies the number Nh of antenna ports in the first dimension; and a parameter that specifies a number Nv of antenna ports in the second dimension.

In some embodiments, the precoder parameters specify at least one of the following parameter combinations:
the number Nh of antenna ports in the first dimension and the number Nv of antenna ports in the second dimension,
a number Mh of beams available in the first dimension and a number Mv of beams available in the second dimension, and
an oversampling factor Qh in the first dimension; and an oversampling factor Qv in the second dimension.

Action 402

The UE 120 determines the precoder codebook based on the received information regarding the precoder parameters.

In some embodiments, a precoder in the determined precoder codebook is constructed or generated by combining a precoder matrix targeting the first dimension and a precoder matrix in or for the second dimension in a way equivalent to using a Kronecker product. It is the generated precoders that have a Kronecker structure. This means that, in an example where the first dimension is the horizontal dimension and the second dimension is the vertical dimension, a total precoder W is partly created by combining a size-Nh horizontal precoder $W_0$ with a size-Nv vertical precoder $W_1$ by means of a Kronecker product $W_0 \otimes W_1$. The other part may be by multiplication by $W_2$ which may be equivalently expressed as $$v_{i,j} = W_0 \otimes W_1.$$

$$W_{i,j,l} = \begin{bmatrix} v_{i,j} & v_{i,j} \\ v_{i,j} & \varphi_1 v_{i,j} \end{bmatrix}$$

So the total precoder W is a function of $W_0 \otimes W_1$, i.e. $W = f(W_0 \otimes W_1)$.

The determined precoder codebook may be a DFT based codebook. In some embodiments, the DFT based codebook may comprise a first DFT based codebook for the first dimension, and a second DFT based codebook for the second dimension, wherein the second dimension is orthogonal to the first dimension.

Action 403

In some embodiments, the UE 120 selects at least one precoder matrix from the determined precoder codebook based on a measure of performance associated with the at least one precoder matrix. To measure the performance, the UE 120 may typically multiply an estimate of the downlink channel with a precoder to create an effective channel. From said effective channel it may calculate an estimate of the received power and correspondingly, choose the precoder from the precoder codebook which maximizes the received power.

The UE 120 may select at least one precoder matrix from the determined precoder codebook by selecting a first precoder matrix factor associated with the first dimension, and selecting a second precoder matrix factor associated with the second dimension.

In some embodiments, selecting at least one precoder matrix further comprises selecting a third precoder matrix factor that is frequency-dependent.

The third precoder matrix factor may comprise a selection vectors, where each selection vector may select one of a plurality of beams.

Action 404

The UE 120 may transmit at least one PMI to the base station 110. The at least one PMI corresponds to the selected at least one precoder matrix.

Transmitting the at least one PMI to the base station 110, may comprise transmitting a first precoder matrix indicator associated with the first dimension with a first periodicity, and transmitting a second precoder matrix indicator associated with the second dimension at or with a second periodicity different from the first periodicity.

The first precoder matrix indicator associated with the first dimension may indicate the first precoder matrix factor, e.g. the precoder $W_0$, the second precoder matrix indicator associated with the second dimension may indicate the second precoder matrix factor, e.g. the precoder $W_1$. The third precoder matrix factor may then be the frequency selective precoder matrix factor $W_2$ discussed below.

Embodiments herein will now be further described and explained. The text below is applicable to and may be combined with any suitable embodiment described above. In the following text the first dimension is exemplified by the horizontal dimension and the second dimension is exemplified by the vertical dimension. Other orientations of the first and second dimensions are however also conceivable, and the teaching herein applies equally to such other orientations of the first and second dimensions.

Some embodiments provide a parameterizable codebook structure where the network or eNodeB such as the base station 110 signals the precoder parameters to the UE 120. The signaled precoder parameters include information used for determining the set of beams that are part of the precoder codebook. FIG. 5 is a timing diagram showing example signal and timing flow between the base station 110 and the UE 120. In some embodiments, the base station 110 sends 501 precoder parameters to the UE 120. The UE 120 determines or generates 502 a precoder codebook based on the precoder parameters received from the base station 110, and selects 503 at least one precoder matrix from the generated codebook based on e.g. an estimate of which one of the plurality of precoders matrices in the codebook would yield the highest throughput if said precoder matrix would be used for precoding downlink transmissions to the UE 120. The UE 120 sends 504 at least one PMI to the base station 110 that indicates the at least one selected precoder matrix. The base station 110 determines or generates 505 the indicated precoder matrix for use in beamforming for transmission to the UE 120.

Some embodiments include a precoder structure having a horizontal precoder $W_0$ and a vertical precoder $W_1$, each possibly with its own PMI, which is signaled back by the UE 120. The total precoder may then be defined as a general matrix-valued function of $W_0 \otimes W_1$, i.e. $W=f(W_0 \otimes W_1)$. This is related to Actions 304, 404 and 504 above. In other words, it is the generated or constructed precoders that have a Kronecker structure, i.e. a total precoder W partly is partly created by combining a size-Nh horizontal precoder W0 with a size-Nv vertical precoder W1 by means of a Kronecker product $W_0 \otimes W_1$. So the total precoder W is a function of $W_0 \otimes W_1$, i.e. $W=f(W_0 \otimes W_1)$.

The techniques related to the disclosure herein may be applied in a UE such as the UE 120 as well as in the base station 110, e.g. an eNodeB, or in other devices. With a Kronecker precoder structure with separate PMI reporting, as used in some embodiments, two codebooks of size N are required to supply N beams each in horizontal and vertical dimensions. Since both precoders need not necessarily be updated with the same frequency/time granularity, a reduction of overhead in PMI reporting is achieved.

In some embodiments, a Kronecker precoder structure with separate PMI reporting supports different time/frequency granularity of PMI reporting in horizontal and vertical dimensions. This decreases the signaling overhead and improves performance when channel correlation properties differ between dimensions.

The codebook may be tailored for many different antenna array configurations since it is parameterizable. The parameters may be signaled to the UE 120 so that both the network such as the base station 110 and the UE 120 knows the elements of the codebook(s). According to embodiments herein, the whole codebook does not need to be transmitted to the UE 120. It is sufficient to transmit the precoder parameters to the UE 120, which causes a large reduction in overhead. Complexity reductions may be achieved if the UE 120 performs a sequential search. Some embodiments provide for flexible configuration of per dimension frequency-selective beam selection in a frequency selective matrix factor, $W_2$. For example, beam selection in $w_2$ may be configured to only be allowed in the horizontal dimension.

Some embodiments include a precoder codebook structure that is parameterizable to at least tailor the codebook for different antenna array configurations of the the base station 110, e.g. eNodeB, or the UE 120. The precoder codebook may be used for determining feedback information that includes selected precoder(s), e.g. by the UE 120. The precoder codebook may also be used as an input for determining how to schedule and transmit from the network or the base station 110, e.g. eNodeB.

Antenna array configurations may be at least partially described by the number of antenna columns corresponding to the horizontal dimension $N_h$, the number of antenna rows corresponding to the vertical dimension $N_v$, and number of different polarizations $N_p$ such as the number of dimensions corresponding to different polarizations $N_p$. The total number of antennas is thus $N_T=N_p N_h N_V$.

The antenna array configuration may correspond to a physical antenna array with the same number of antenna ports as antenna elements in the array, where each antenna port corresponds to one antenna element. However, the physical antenna array may also comprise more antenna elements than the number of antenna ports. In this case, several antenna elements would be grouped into one antenna port available to baseband processing.

In some embodiments wherein a total number of ports $N_T$ is given, there is a set of (Nh,Nv) combinations available, which may be a subset of all possible combinations. E.g. for a total of $N_T=32$ ports, it may be (1,16), (2,8), (4,4), . . . . The port layout may then be signaled by a number 0, 1, 2, . . . instead of signaling Nh and Nv separately.

The number of different polarizations $N_p \in \{1,2\}$ may correspond to either a physical antenna array of co-polarized antenna elements or a physical antenna array of cross-polarized antenna elements.

Figure 6:
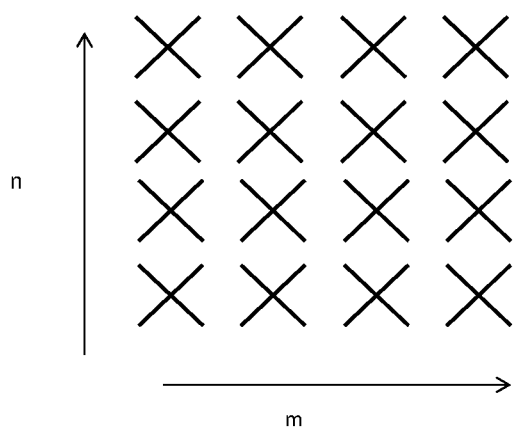
FIG. 6 is a diagram showing a two-dimensional antenna array according to embodiments herein.

An example of a two-dimensional (2D) antenna array can be seen in FIG. 6. Let the antenna port at horizontal index m, vertical index n and polarization index p have the antenna port index $i=N_h N_v p+N_v m+n$.

A corresponding codebook structure targets a 2D antenna array. However, a 1D antenna array such as a Uniform Linear Array (ULA) is an important special case of the 2D antenna array. It should also be noted that horizontal and vertical could alternatively be thought of as dimension 1 and dimension 2, or first dimension and second dimension as used herein.

The parameters of the parameter-based codebook are signaled to the UE 120. The signaling may be conducted by, e.g., a RRC message, Media Access Control (MAC) header element or dynamically using physical downlink control channels. In some embodiments, the UE 120 knows the general structure of the codebook that applies for the signaled parameters. Based on that knowledge and based on the signaled parameters, the UE may determine the constituent precoders in the actual codebook(s). The UE may be configured with the structure of the precoder codebook.

Currently, in the LTE standard, different codebooks are specified for different numbers of antenna ports. However, with a 2D antenna array, each antenna array configuration $(N_h, N_v, N_p)$ would benefit from having a tailored codebook according to embodiments herein. Specifying the codebook only by the number of antenna ports $N_T$ according to prior art creates an ambiguity as different antenna array configurations can have the same number of antenna ports. Further, to specify a separate codebook for each antenna array configuration according to prior art would result in a vast number of codebooks, and is infeasible. With a parameter-based codebook structure according to embodiments herein, only the codebook structure would have to be specified.

The number of beams M available in the codebook may also be included in the parameters of the parameter-based codebook. Preferably, the number of beams may also be supplied per dimension, resulting in two additional parameters, the number of beams available in the horizontal dimension $M_h$ and the number of beams available in the vertical dimension $M_v$. Equivalently, this may be expressed in terms of oversampling factors $Q_h$ and $Q_v$, e.g. with DFT based beams, so that $M_h=Q_h N_h$ and $M_v=Q_v N_v$. In that case, the parameters of the parameter-based codebook would be $(N_h, N_v, N_p, Q_h, Q_v)$.

The parameter-based codebook structure according to embodiments herein achieves a large flexibility in codebook structure, required by the many possible antenna array configurations while keeping the overhead of signaling the codebook to the UE 120 at a minimum.

The precoders of the parameter-based codebook may be considered to be composed of a horizontal component $W_0$ and a vertical component $W_1$, where $W_0$ is a $N_h \times 1$ beamforming vector chosen from a codebook $X_H$. The precoder is chosen from the codebook by means of a PMI k=0, . . . , $M_h-1$.

$W_1$ is a $N_v \times 1$ beamforming vector chosen from a codebook $X_V$. The precoder is chosen from the codebook by means of a PMI l=0, . . . , $M_h-1$.

Note that $X_H$ and $X_V$ denotes a set of precoder vectors. One possible representation of such a set is to let each column of a matrix represent a precoder. Other representations are also possible, including a table of precoders. The total precoder may be a general matrix-valued function of the Kronecker product between the two vectors:

$$W=f(W_0 \otimes W_1).$$

The function $f(X)$ may depend on other precoders matrices, possibly from additional codebooks with separate PMIs to be reported. In the general case, the codebooks $X_H$ and $X_V$ and the function $f(X)$ may be arbitrarily defined by a set of configurable parameters. Such a definition may include explicitly signaling a set of beams to be used in each codebook.

In some embodiments, each codebook may comprise or consist of a set of beams uniquely defined by the number of beams M in the codebook and the number of antenna ports N corresponding to the targeted dimension of the codebook. The targeted dimension may relate to either the first dimension or the second dimension since it is related to the vertical or horizontal codebooks Xv and Xh. Note that, even though e.g. $W_0$ and $X_H$ are called precoders and codebooks respectively in this document, one can equivalently use the terminology vector/matrix for $W_0$ and set of vectors/matrices for $X_H$. With such an interpretation, only the total precoder W is labeled a precoder which is taken from a large joint codebook. Furthermore, the term PMI may just be an index pointing into an associated set of matrices/precoders referred to as a codebook. It may also be implicit in that it can be derived from an index pointing out the total precoder W.

Note that there are many equivalent ways to formulate the Kronecker product $W_0 \otimes W_1$. Another equivalent way is to express it as a vectorization of an outer product, vec $(W_1 W_0^T)$. Another equivalence is to permute the rows and/or columns of $W_0 \otimes W_1$ or of W. These equivalent formulations achieve the same effect, i.e., that a first precoder $W_0$ is applied to a first dimension, e.g., horizontal precoder $W_0$ applied to all rows of the two-dimensional antenna array, and a second precoder $W_1$ is applied to a second dimension, e.g., vertical precoder $W_1$ applied to all the columns of the antenna array or antenna port layout.

Or: antenna array or antenna port configuration. Additional precoders may be included in the codebook(s) that depart from the structure described herein.

Furthermore, in some embodiments, the described codebook structure may only be applied for a certain number of rows of the total precoder W, i.e. it may only be applied for a certain subset of the antenna ports. This limitation in considering the number of rows may, for example, be taken as a particular subset out of the set $\{3, 4, \ldots, 128\}$, where each element denotes a possible number of rows.

A strength of the generalized Kronecker precoder structure with separate PMI reporting is that the different PMI: s $(k, l, \ldots)$ may be reported back by the UE 120 with different granularity in time and frequency. For example, if the spatial channel correlation is larger in the vertical dimension than in the horizontal dimension, the horizontal PMI k may be reported more frequently than the vertical PMI l. This has the effect of reducing the overhead in CSI reporting.

The generalized Kronecker precoder structure with separate PMI reporting also helps to reduce the complexity for the UE 120 when deciding which precoder to choose. For the UE 120 to decide which precoder gives the best performance, it has to search through all the possible precoders. Without a generalized Kronecker precoder structure with separate PMI reporting, the UE 120 would have to search through all the $M=M_h M_v$ precoders to find the best performing one. However, with a generalized Kronecker precoder structure with separate PMI reporting according to embodiments herein, the UE 120 may do a sequential search. It first decides the best horizontal precoder $W_0$ and then the best vertical precoder $W_1$. This requires only $M_h+M_v$ searches, and since $M_h+M_v \ll M_h M_v$ for large $M_h$ and $M_v$, this reduces the complexity for the UE 120.

An important special case of the generalized Kroencker precoder structure is the ternary Kronecker precoder structure. In these embodiments, the total precoder w comprises three precoders:

A horizontal precoder $W_0$, which is chosen from a codebook $X_H$ comprising beams in the horizontal direction. The codebook $X_H$ is configured with the parameters $N_h$ and $M_h$ resulting in a codebook comprising or consisting of $M_h$ beams/precoders of dimension $N_h \times 1$. The precoder is chosen from the codebook by means of a PMI $k=0, \ldots, M_h-1$.

A vertical precoder $W_1$, which is chosen from a codebook $X_V$ consisting of beams in the vertical direction. The codebook $X_V$ is configured with the parameters $N_v$ and $M_v$ resulting in a codebook consisting of $M_v$ beams/precoders of dimension $N_v \times 1$. The precoder is chosen from the codebook by means of a PMI $l=0, \ldots, M_h-1$.

A possibly frequency-selective precoder $W_2$, chosen from a codebook $X_F$, for Frequency-selective. The codebook comprises or consists of matrices of dimension $N_p \times r$, where r is the desired rank. The precoder is chosen by means of a PMI $f$, wherein $f$ is an arbitrary name for an index which indexes the set of possible $W_2$ matrices.

$W_0$, $W_1$, $W_2$ may be reported with different time/frequency granularities. For example, $W_0$, and $W_1$ may be of wideband character, the same across the possible scheduling bandwidth, while $W_2$ may frequency-selective. In general, any kind of combination of time/frequency granularities for the three precoders/PMIs is possible, but a typical setting would be to use wideband granularity for at least $W_0$ and $W_1$.

The total precoder w is then formed as $$W=(W_0 \otimes W_1)W_2$$

in the case when $N_p=1$, i.e. targeting an antenna array of co-polarized antenna elements, and $$W = \begin{bmatrix} W_0 \otimes W_1 & 0 \\ 0 & W_0 \otimes W_1 \end{bmatrix} W_2$$

in the case when $N_p=2$, targeting an antenna array of cross-polarized antennas. The latter formula may also be used to target a co-polarized antenna setup with appropriate precoder sets used for the three different precoder types $W_0$, $W_1$, $W_2$.

As seen, this is a special case of the general case of $W=f(W_0 \otimes W_1)$. Here, $$f(X)=(I_{N_p} \otimes X)W_2,$$

where $I_{N_p}$ is a size-$N_p$ identity matrix, i.e. an $N_p \times N_p$ identity matrix.

In this case, three PMIs (k, l, $f$), which may be represented by one index for the total precoder, would be reported back by the UE 120. As in the general case, the CSI reporting may be done with different time/frequency granularity.

In a variation of the aforementioned ternary precoder structure, the horizontal precoder $W_0$ and the vertical precoder $W_1$ may be made fat, i.e. comprising several beams. The frequency selective precoder matrix $W_2$ then comprises selection vectors, selecting which beams in the horizontal and vertical precoder matrices to use. To formalize:

The horizontal precoder $W_0$ is a $N_h \times N_{b,h}$ matrix which is taken from the codebook $\tilde{X}_H$, where b stands for beams, as in number of beams. The entries of $\tilde{X}_H$ consist of matrices with $N_{b,h}$ columns, where each column is a precoder from the codebook $X_H$. An example of how the k:th entry of $\tilde{X}_H$ could look is $\tilde{X}_H^k = [X_H^k \, X_H^{k+1} \, \ldots \, X_H^{k+N_{b,h}-1}]$. The consecutive inclusion of precoders in $\tilde{X}_H$ from the $X_H$ codebook shall not be considered limiting. Rather, any combination of $N_{b,h}$ size subsets of $X_H$ can constitute $\tilde{X}_H$.

The vertical precoder $W_1$ is in a similar fashion a $N_v \times N_{b,v}$ matrix which is taken from the codebook $\tilde{X}_V$, which is constructed in the same manner as its horizontal counterpart.

The frequency-selective, rank-specific precoder $W_2$ can for example be constructed as $W_2 = A \otimes (e_H \otimes e_V)$ in the case of rank one, where $A$ is a $N_p \times 1$ precoder matrix from the $X_F$ codebook.

$e_H$ is a selection vector consisting of only one non-zero element (which is a one), aimed at selecting one of the columns in $\tilde{X}_H$. E.g. to select the second column from $\tilde{X}_H$, the selection vector $e_H^2 = [0\ 1\ 0\ \ldots\ 0]^T$ should be used.

Similarly, $e_V$ is a vertical selection vector.

To see that $e_H$ and $e_V$ efficiently select beams, consider the case when $N_p = 2$ and a horizontal beam number $a < N_{b,h}$ and vertical beam number $b < N_{b,v}$ are selected:

$$W = \begin{bmatrix} W_0 \otimes W_1 & 0 \\ 0 & W_0 \otimes W_1 \end{bmatrix} W_2 = \begin{bmatrix} \tilde{X}_H^k \otimes \tilde{X}_V^l & 0 \\ 0 & \tilde{X}_H^k \otimes \tilde{X}_V^l \end{bmatrix} (A \otimes (e_H^a \otimes e_V^b)) =$$

$$(I_2 \otimes (\tilde{X}_H^k \otimes \tilde{X}_V^l))(A \otimes (e_H^a \otimes e_V^b)) = A \otimes ((\tilde{X}_H^k \otimes \tilde{X}_V^l)(e_H^a \otimes e_V^b)) =$$

$$A \otimes ((\tilde{X}_H^k e_H^a) \otimes (\tilde{X}_V^l e_V^b)) = A \otimes (X_H^{k+a} \otimes X_V^{l+b}) =$$

$$\begin{bmatrix} a_1 \cdot (X_H^{k+a} \otimes X_V^{l+b}) \\ a_2 \cdot (X_H^{k+a} \otimes X_V^{l+b}) \end{bmatrix} = \begin{bmatrix} X_H^{k+a} \otimes X_V^{l+b} & 0 \\ 0 & X_H^{k+a} \otimes X_V^{l+b} \end{bmatrix} A$$

where the following rule for Kronecker products has been used:

$(A \otimes B)(C \otimes D) = (AC) \otimes (BD)$

For higher ranks, the precoder $W_2$ may be constructed in the general form $$W_2 = \begin{bmatrix} (e_H^{a_1} \otimes e_V^{b_1}) & \ldots & (e_H^{a_r} \otimes e_V^{b_r}) \\ e^{j\omega_1}(e_H^{a_1} \otimes e_V^{b_1}) & \ldots & e^{j\omega_r}(e_H^{a_r} \otimes e_V^{b_r}) \end{bmatrix},$$

i.e., each of the r spatial streams may choose arbitrary beams a and b from $\tilde{X}_H$ and $\tilde{X}_V$ respectively, as well as arbitrary phase differences between polarizations w.

In a preferred embodiment, DFT-based precoder codebooks are used in the horizontal and vertical codebooks $X_H$ and $X_V$. This may be interpreted as meaning that the phase difference for two consecutive elements from the same column of a $W_0$ (or $W_1$) precoder is constant (possibly after an appropriate permutation of the elements in the column).

The horizontal codebook may be expressed as $$X_H^k = \begin{bmatrix} 1 & e^{j2\pi\frac{1k+\Delta}{N_h Q_h}} & \ldots & e^{j2\pi\frac{(N_h-1)k+\Delta}{N_h Q_h}} \end{bmatrix}^T,$$

k=0, ..., $N_h Q_h - 1$, where $Q_h$ is a horizontal oversampling factor and $\Delta$ can take on value in the interval 0 to 1 so as to "shift" the beam pattern. For example, $\Delta = 0.5$ may create a symmetry of beams with respect to the broadside of an antenna array. Broadside here means, if the 2D antenna array is seen to lie in the yz-plane of a coordinate system, the direction of maximum radiation would be described by a normal vector to the yz-plane, i.e. a vector along the x-axis. This direction of this vector may be described in polar coordinates by $(\phi, \theta) = (0°, 90°)$. So if a symmetry is created of the beams along the broadside of the array, the beams will be symmetric around 0° in azimuth and 90° in zenith, respectively. So the broadside of the array refers to both vertical and horizontal dimension.

The vertical codebook can be expressed as $$X_V^l = \begin{bmatrix} 1 & e^{j2\pi\frac{1k+\Delta}{N_v Q_v}} & \ldots & e^{j2\pi\frac{(N_v-1)k+\Delta}{N_v Q_v}} \end{bmatrix}^T,$$

l=0, ..., $N_v Q_v - 1$, where $Q_v$ is a vertical oversampling factor and $\Delta$ is similarly defined as above.

In some example embodiments, a Radio Resource Control (RRC) signalling message may say which codebook to use out of a set of possible codebooks, such as codebook A, codebook B, ... etc., possible only two codebooks in this set. In each codebook, at least a subset of the constituent precoders can be generated by a function $f(W_0 \otimes W_1)$, where W0 and W1 are taken from a set of DFT beams, respectively. This formula is parameterized by Nv, Nh, and/or the number of beams in each dimension, Mv, Mh. The codebooks are such that Mv>=Nv, Mh>=Nh). The at least two different codebooks have at least one parameter different in the set of parameters Nv, Nh, Mv, Mh.

Figure 7:
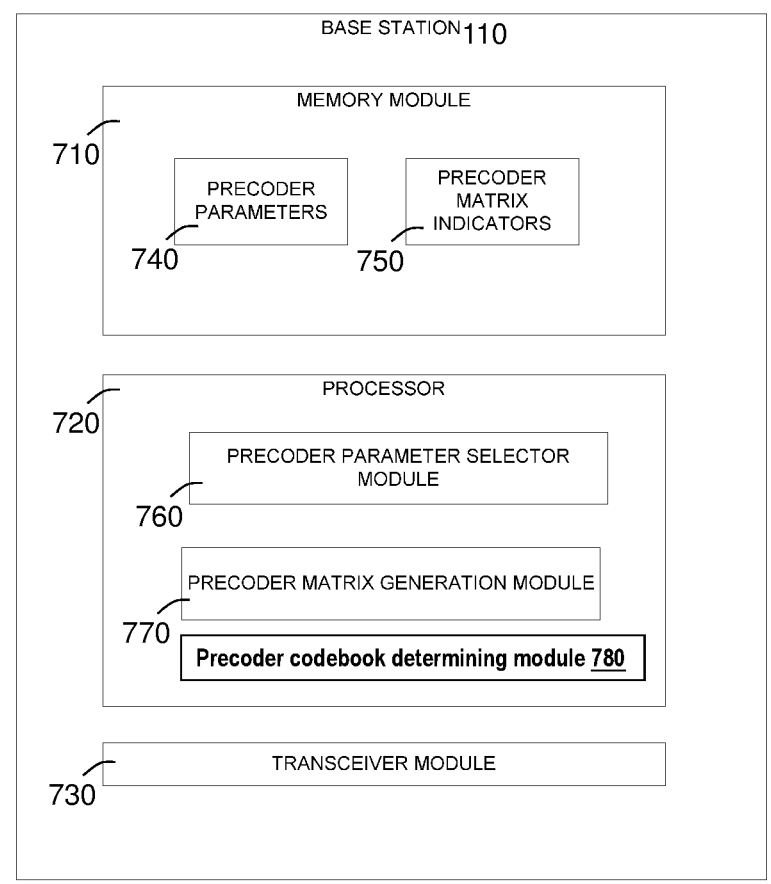
FIG. 7 is a block diagram depicting embodiments of a base station.

Returning now to the drawing figures, there is shown in FIG. 7 a block diagram of the base station 110 constructed in accordance with some embodiments. In one embodiment, the base station 110 may include a memory, a processor and a transceiver. In one embodiment, the base station may include a memory module 710, a processor 720 and a transceiver module 730. The memory or memory module 710 is configured to store precoder parameters 740 and precoder matrix indicators 750. The processor 720 includes a precoder parameter selector module 760 and a precoder matrix generation module 770. The transceiver or transceiver module 730 is configured to transmit precoder parameters to a UE 120 and to receive precoder matrix indicators from the UE 120. The precoder parameter selector module 760 is configured to choose precoder parameters such as, for example, a number of antennas or antenna ports in a first dimension, a number of antennas or antenna ports in a second dimension, a number of beams in the first dimension, a number of beams in the second dimension, an amount of oversampling in the first dimension and an amount of oversampling in the second dimension. These precoder parameters are transmitted to the UE 120 by the transceiver. In some embodiments, the UE 120 uses these parameters to construct a precoder codebook, to test each of a plurality of precoder matrices obtained from the precoder codebook, to pick a precoder matrix or matrices and to transmit at least one PMI indicating the precoder matrix or matrices to the base station. The precoder matrix generation module 770 of the base station 110 generates the precoder matrix or matrices indicated by the at least one PMI.

Figure 8:
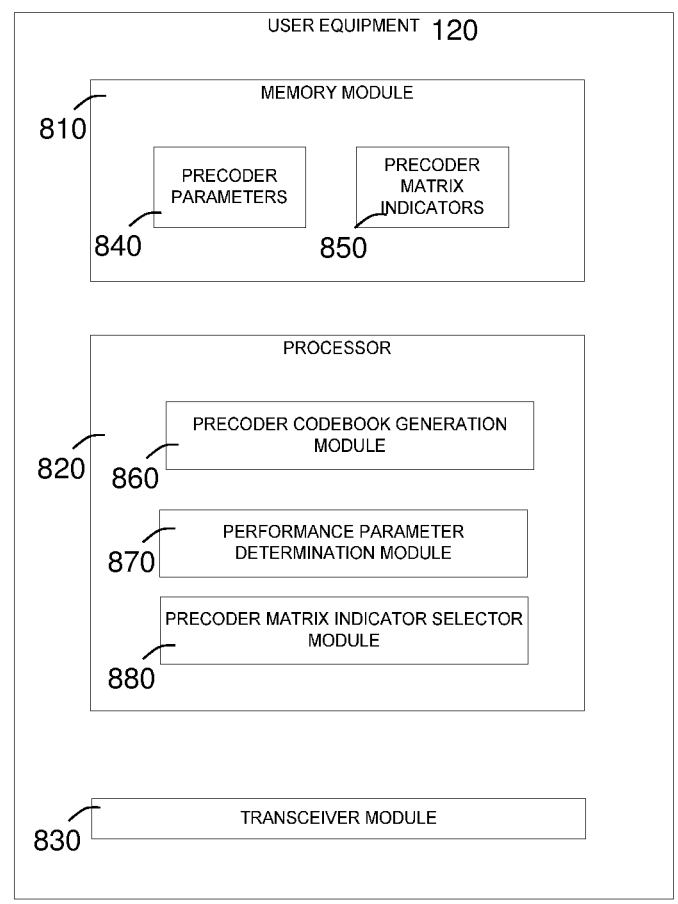
FIG. 8 is a block diagram depicting embodiments of a UE.

FIG. 8 is a block diagram of an exemplary user equipment such as the UE 120 constructed in accordance with some embodiments. In one embodiment, the UE 120 may include a memory, a processor and a transceiver. In one embodiment, the UE 120 may include a memory module 810, a processor 820 and a transceiver module 830. The memory or memory module 810 is configured to store precoder parameters 840 and precoder matrix indicators 850. The processor 820 includes a precoder codebook generation module 860, a performance parameter determination module 870 and a precoder matrix indicator selector module 880. The transceiver or transceiver module 830 is configured to receive from the base station 110 a set of one or more precoder parameters 840 from which the precoder codebook generation module 860 is configured to generate a codebook. The performance parameter determination module 870 is configured to test each of a plurality of precoder matrices in the codebook to determine a precoder matrix or matrices, i.e., the matrix or set of matrices providing optimum performance. The precoder matrix indicator selector module 880 is configured to select the PMI corresponding to the determined matrix or matrices. The transceiver or transceiver module 830 is configured to transmit the selected PMI to the base station, which uses the PMI to generate the determined matrix or matrices.

Figure 9:
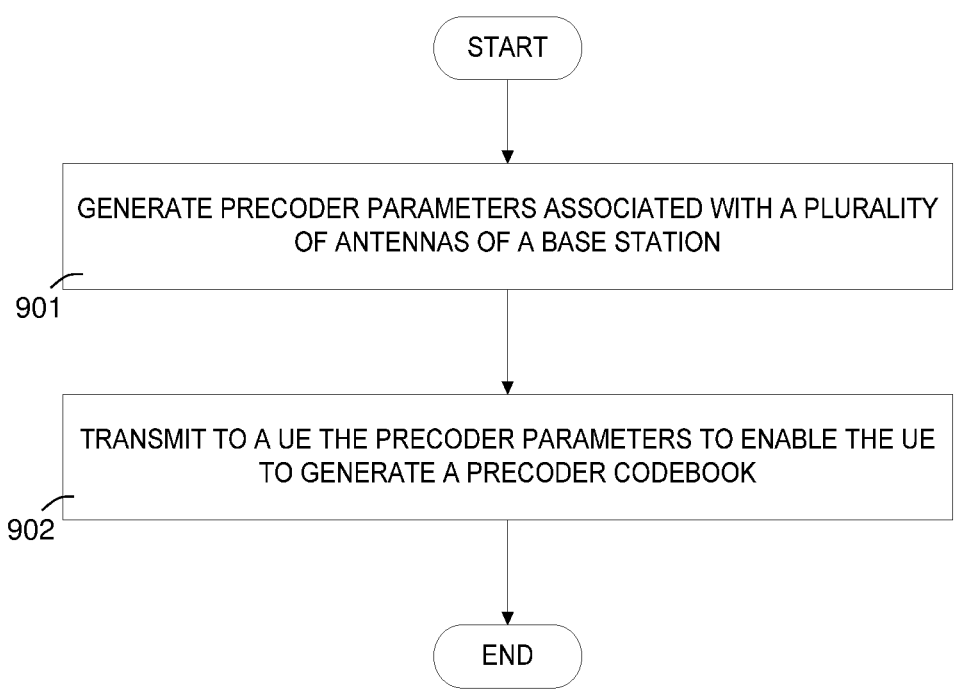
FIG. 9 is a flowchart depicting embodiments of a method in a base station.

FIG. 9 is a flowchart of an exemplary process for generating and transmitting a set of one or more precoder parameters. Precoder parameters associated with a plurality of antennas of a base station are generated 901. The generated precoder parameters are transmitted 902 to a UE such as the UE 120 to enable the UE to generate or determine a precoder codebook.

Figure 10:
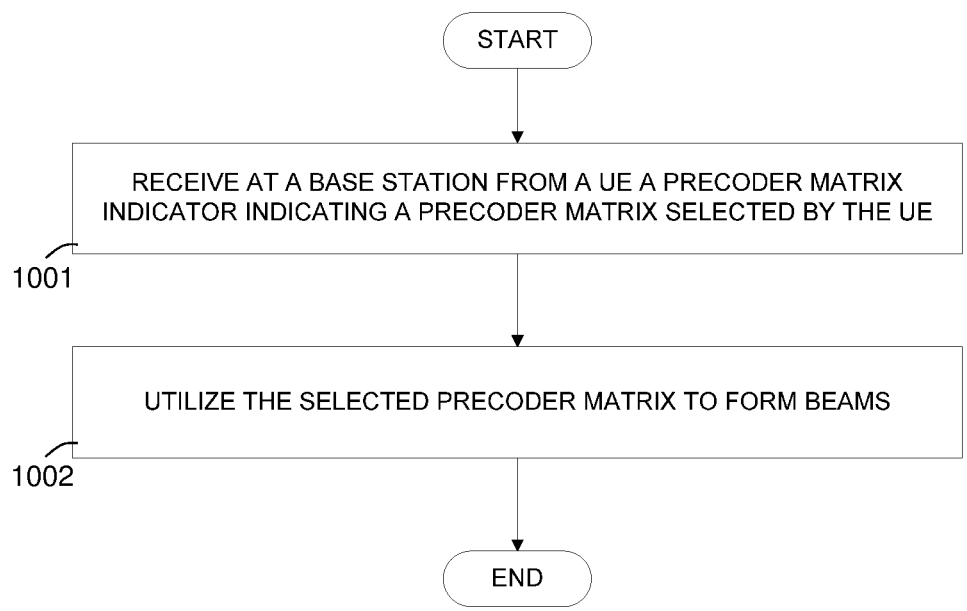
FIG. 10 is a flowchart depicting embodiments of a method in a base station.

FIG. 10 is a flowchart of an exemplary process for generating a precoder matrix used to form beams. A base station such as the base station 110 receives 1001 from a UE such as the UE 120 a precoder matrix indicator indicating a precoder matrix selected by the UE. The indicated precoder matrix is selected 1002 to form beams at the base station.

Figure 11:
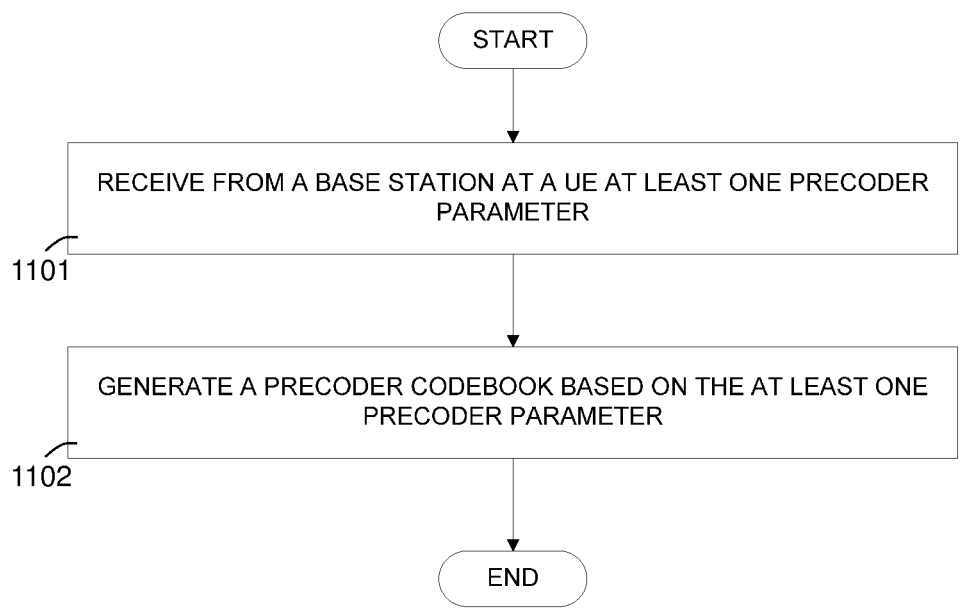
FIG. 11 is a flowchart depicting embodiments of a method in a UE.

FIG. 11 is a flowchart of an exemplary process for receiving precoder parameters and generating corresponding codebooks at a UE such as the UE 120. The UE receives 1101 at least one precoder parameter from a base station such as the base station 110. The UE generates 1102 a precoder codebook based on the received at least one precoder parameter.

Figure 12:
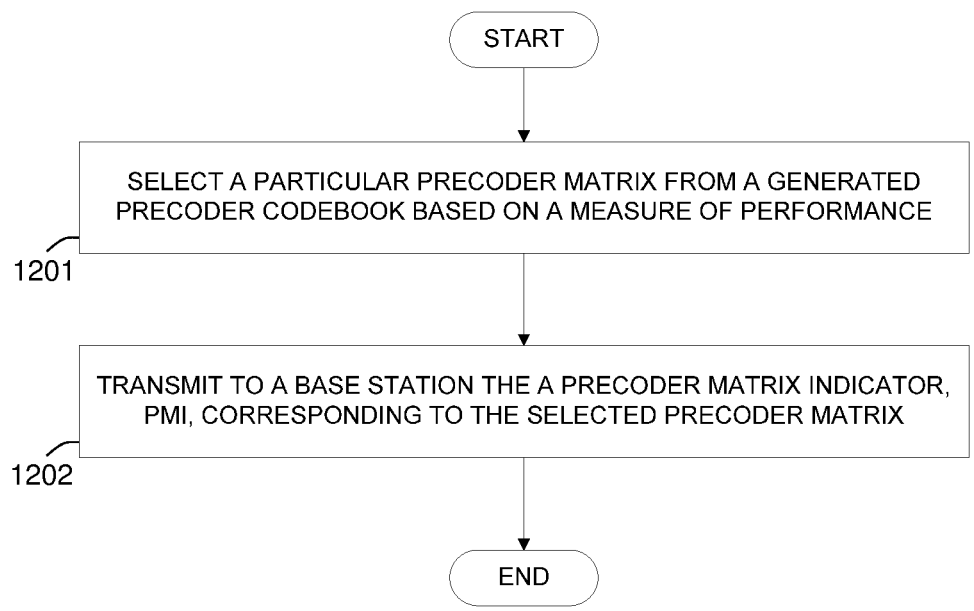
FIG. 12 is a flowchart depicting embodiments of a method in a UE.

FIG. 12 is a flowchart of a process for selecting a precoder matrix from a codebook and transmitting corresponding PMI to the base station such as the base station 110 at a UE such as the UE 120. A particular precoder matrix is selected 1201 from a precoder codebook based on a measure of performance. A PMI corresponding to the particular precoder matrix is transmitted 1202 to the base station.

To perform the method actions for enabling the UE 120 to determine a precoder codebook in the wireless communication system 100 described above, the base station 110 may comprise the following arrangement depicted in FIG. 7.

In some embodiments, the base station 110 is operative to, e.g. by means of the precoder parameter selector module 760 being configured to, generate precoder parameters associated with a plurality of antenna ports of the base station 110. The precoder parameters relate to a first dimension and a second dimension of the precoder codebook. The first and second dimensions of the precoder codebook matches a two-dimensional distribution of the plurality of antenna ports. The plurality of antenna ports may comprise a number NT of antenna ports that is a function of the number Nh of antenna ports in the first dimension and the number Nv of antenna ports in the second dimension. The precoder parameters may comprise a parameter that specifies a number Nh of antenna ports in the first dimension and a parameter that specifies a number Nv of antenna ports in the second dimension.

In some embodiments, one of the numbers Nv and Nh of antenna ports is equal to one.

In some embodiments, the number of antenna ports NT is equal to Nh*Nv*Np, where Np represents a number of different polarizations. The number Np of different polarizations may be seen to correspond to a further dimension, in addition to the first and second dimensions.

The precoder parameters may further comprise a parameter that specifies a number Mh of beams available in the first dimension; and a parameter that specifies a number Mv of beams available in the second dimension. The numbers Mh and Mv of beams may be dependent on corresponding oversampling factors Qh and Qv, respectively.

The base station 110 is further operative to, e.g. by means of the transceiver module 730 being configured to, transmit to the UE 120, information regarding the precoder parameters enabling the UE 120 to determine the precoder codebook. The precoder parameters are associated with a plurality of antenna ports of the base station 110. The precoder parameters relate to a first dimension and a second dimension of the precoder codebook. The plurality of antenna ports comprises a number $N_T$ of antenna ports that is a function of a number Nh of antenna ports in the first dimension, and a number Nv of antenna ports in the second dimension.

The precoder parameters may comprise a parameter that specifies the number Nh of antenna ports in the first dimension, and a parameter that specifies the number Nv of antenna ports in the second dimension.

In some embodiments the precoder parameters specify at least one of the following parameter combinations:
- the number Nh of antenna ports in the first dimension and the number Nv of antenna ports in the second dimension, and
- a number Mh of beams available in the first dimension and a number Mv of beams available in the second dimension
- an oversampling factor Qh in the first dimension; and an oversampling factor Qv in the second dimension.

The base station 110 is further operative to, e.g. by means of precoder codebook determining module 780 being configured to, determine the precoder codebook based on the precoder parameters.

A precoder in the precoder codebook may be constructed or generated by combining a precoder matrix in the first dimension and a precoder matrix in the second dimension in a way equivalent to using a Kronecker product.

The base station 110 may further being operative to, e.g. by means of the transceiver module 730 being configured to, receive from the UE 120, at least one PMI indicating at least one precoder matrix selected by the UE 120.

The base station 110 may further being operative to, e.g. by means of the precoder matrix generation module 770 being configured to, generate the indicated at least one precoder matrix based on the at least one PMI;

The base station 110 may further be operative to utilize the indicated at least one precoder matrix to form beams for transmission to the UE 120.

The at least one PMI may comprise a first precoder matrix indicator that indicates a first precoder matrix associated with the first dimension; and a second precoder matrix indicator that indicates a second precoder matrix associated with the second dimension.

To perform the method actions for determining a precoder codebook in the wireless communication system 100 described above, the UE 120 may comprise the following arrangement depicted in FIG. 8.

The UE 120 is operative to, e.g. by means of the transceiver module 830 being configured to, receive from the base station 110, information regarding precoder parameters enabling the UE 120 to determine the precoder codebook of the precoder codebook. The precoder parameters are associated with a plurality of antenna ports of the base station 110. The precoder parameters relate to a first dimension and a second dimension of the precoder codebook. The plurality of antenna ports comprises a number $N_T$ of antenna ports that is a function of a number Nh of antenna ports in the first dimension, and a number Nv of antenna ports in the second dimension.

The precoder parameters may comprise a parameter that specifies the number Nh of antenna ports in the first dimension, and a parameter that specifies the number Nv of antenna ports in the second dimension.

In some embodiments, the precoder parameters specify at least one of the following parameter combinations:
  the number Nh of antenna ports in the first dimension and the number Nv of antenna ports in the second dimension,
  a number Mh of beams available in the first dimension and a number Mv of beams available in the second dimension, and
  an oversampling factor Qh in the first dimension; and an oversampling factor Qv in the second dimension.

The UE 120 is further operative to, e.g. by means of the precoder codebook generation module 860 being configured to, determine the precoder codebook based on the received information regarding the precoder parameters.

In some embodiments, a precoder in the determined precoder codebook is constructed or generated by combining a precoder matrix in or for the first dimension and a precoder matrix in or for the second dimension in a way equivalent to using a Kronecker product.

The determined precoder codebook may be a DFT based codebook. In some embodiments the DFT based codebook may comprise a first DFT based codebook for the first dimension, and a second DFT based codebook for the second dimension, wherein the second dimension is orthogonal to the first dimension The UE 120 may further be operative to, e.g. by means of the precoder matrix indicator selector module 880 being configured to, select at least one precoder matrix from the determined precoder codebook based on a measure of performance associated with the at least one precoder matrix.

The UE 120 may further be operative to, e.g. by means of the precoder matrix indicator selector module 880 being configured to, select at least one precoder matrix out of the at least one precoder matrix by selecting a first precoder matrix factor associated with a first dimension; and selecting a second precoder matrix factor associated with a second dimension.

The UE 120 may further be operative to, e.g. by means of the precoder matrix indicator selector module 880 being configured to, select at least one precoder matrix from the determined precoder codebook by selecting a first precoder matrix factor associated with the first dimension; and selecting a second precoder matrix factor associated with the second dimension.

The UE 120 may further be operative to, e.g. by means of the transceiver module 830 being configured to, transmit at least one PMI to the base station 110. The at least one PMI corresponds to the selected at least one precoder matrix.

The UE 120 may further be operative to, e.g. by means of the transceiver module 830 being configured to, transmit the at least one PMI to the base station 110, by transmitting a first precoder matrix indicator associated with the first dimension with a first periodicity, and transmitting a second precoder matrix indicator associated with the second dimension with a second periodicity different from the first periodicity.

The embodiments herein comprising the process of for determining a precoder codebook in the wireless communication system 100 may be implemented through one or more processors, such as the processor 720 in the base station 110 depicted in FIG. 7, and the processor 820 in the UE 120 depicted in FIG. 8, together with computer program code for performing the functions and actions of the embodiments herein. The program code mentioned above may also be provided as a computer program product, for instance in the form of a data carrier carrying computer program code for performing the functions and actions of the embodiments herein when being loaded into the respective base station 110 and UE 120. One such carrier may be in the form of a Compact Disc-Read Only Memory (CD ROM) disc. It is however feasible with other data carriers such as a memory stick. The computer program code may furthermore be provided as program code on a server and downloaded to the respective base station 110 and UE 120.

The base station 110 and UE 120 may further comprise memories comprising one or more memory modules such as the memory module 710 in the base station 110 depicted in FIG. 7, and the memory module 810 in the UE 120 depicted in FIG. 8. The memory module 710 comprises instructions executable by the processor 720 and the memory module 810 comprises instructions executable by the processor 820.

Those skilled in the art will also appreciate that the modules described above may refer to a combination of analog and digital circuits, and/or one or more processors configured with software and/or firmware, e.g. stored in the memory modules 710 and 810, that when executed by the one or more processors such as the processor 720 and 820 perform the functions and actions of the embodiments herein as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

According to embodiments herein a set of precoder codebooks is provided.

At least part of each precoder codebook in the set of precoder codebooks is possible to generate from a set of precoder parameters comprising any one or more of the following combinations of precoder parameters:
  a number Nh of antenna ports in the first dimension and a number Nv of antenna ports in the second dimension,
  a number Mh of beams available in the first dimension; and a number Mv of beams available in the second dimension, and
  an oversampling factor Qh in the first dimension; and an oversampling factor Qv in the second dimension.

In some embodiments, at least part of each precoder codebook in the set of precoder codebooks is possible to generate from a general common structure that depends on a set of key precoder parameters and set of corresponding precoder parameters.

At least one precoder parameter in the set of precoder parameters differ between the precoder codebooks comprised in the set of precoder codebooks.

Embodiments herein provide a base station such as the base station 110 comprising a precoder codebook comprised in the set of precoder codebooks.

Embodiments herein further provide a UE such as the UE 120 comprising a precoder codebook comprised in the set of precoder codebooks.

The present embodiments can be realized in hardware, or a combination of hardware and software. Any kind of computing system, or other apparatus adapted for carrying out the methods described herein, is suited to perform the functions described herein. A typical combination of hardware and software could be a specialized computer system, e.g., base station or a wireless terminal, having one or more processing elements and a computer program stored on a storage medium that, when loaded and executed, controls the computer system such that it carries out the methods described herein. The present embodiments can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present disclosure is not limited to what has been particularly shown and described herein above. In addition, unless mention was made above to the contrary, it should be noted that all of the accompanying drawings are not to scale. A variety of modifications and variations are possible in light of the above teachings.

The present disclosure advantageously provides a method and system for spatial multiplexing in a wireless communication system. According to one aspect, some embodiments provide a method for generating and transmitting precoder parameters. Precoder parameters associated with a plurality of antennas of a base station are generated at the base station. The base station transmits to a user equipment, UE, the precoder parameters enabling the UE to generate a precoder codebook.

According to this aspect, in some embodiments, the precoder parameters include: a number Nh that specifies a number of antennas in a first dimension of an array of antenna elements; and a number Nv that specifies a number of antennas in a second dimension of the array of antenna elements. In some embodiments, one of Nv and Nh is one. In some embodiments, the precoder parameters include a number of beams Mh available in the first dimension; and a number of beams Mv available in the second dimension. In some embodiments, the parameters Mh and Mv are expressible in terms of corresponding oversampling factors Qh and Qv, respectively. In some embodiment, the method further includes receiving at the base station from the UE, at least one precoder matrix indicator indicating at least one precoder matrix selected by the UE; generating the at least one precoder matrix; and utilizing the generated at least one precoder matrix to form beams.

According to another aspect, some embodiments provide a method of selecting a precoder matrix for spatial multiplexing in a wireless communication system. The method includes receiving from a base station at a user equipment, UE, at least one precoder parameter, and generating a precoder codebook based on the received at least one precoder parameter.

According to this aspect, in some embodiments, the method further includes selecting a particular precoder matrix from the generated precoder codebook based on a measure of performance associated with the particular precoder matrix, and transmitting a precoder matrix indicator, PMI, to the base station, the PMI corresponding to the selected precoder matrix. In some embodiments, selecting a particular precoder matrix includes selecting a first precoder matrix factor associated with a first dimension, and selecting a second precoder matrix factor associated with a second dimension. In some embodiments, selecting a particular precoder matrix further includes selecting a third precoder matrix factor that is frequency-dependent. In some embodiments, the third precoder matrix factor includes selection vectors for selecting a particular one of a plurality of beams.

According to another aspect, some embodiments provide a base station. The base station is operative to store precoder parameters and precoder matrix indicators received from a user equipment, UE. The base station is further operative to select a set of precoder parameters to enable the UE to generate a precoder codebook; and generate a precoder matrix based on the precoder matrix indicators received from the UE.

According to this aspect, the precoder matrix indicators include: a first matrix indicator that indicates a first matrix associated with a first dimension of an antenna array; and a second matrix indicator that indicates a second matrix associated with a second dimension of the antenna array. In some embodiments, the precoder matrix indicators further include a third matrix indicator that indicates a third matrix that is frequency-dependent. In some embodiments, the base station includes a memory configured to store the precoder parameters and precoder matrix indicators. The base station also may include a processor configured to: select the precoder parameters; and generate the precoder matrix. The processor may also include a transceiver configured to transmit the precoder parameters; and receive the precoder matrix indicators.

According to yet another aspect, some embodiments provide a user equipment. The user equipment is operative to store precoder parameters received from a base station; precoder matrix indicators; and performance parameters. The user equipment is further operative to generate a precoder codebook based on the precoder parameters received from the base station, to determine performance obtained from each of a plurality of precoder matrices selected from the precoder codebook; and select precoder matrix indicators based on the performance parameters.

According to this aspect, the user equipment may further include a transceiver module configured to transmit a first precoder matrix indicator associated with a first dimension at a first periodicity and to transmit a second precoder matrix indicator associated with a second dimension with a second periodicity different from the first periodicity. In some embodiments, the precoder codebook generation module is configured to generate a discrete Fourier transform, DFT, based codebook. In some embodiments, a first DFT codebook is generated for a first dimension, and a second DFT codebook is generated for a second dimension orthogonal to the first dimension. In some embodiments, the user equipment further includes a memory configured to store the precoder parameters, the precoder matrix indicators, and the performance parameters. The user equipment may further include a processor configured to generate the precoder codebook; determine the performance; and select precoder matrix indicators. The user equipment may further include a transceiver configured to receive the precoder parameters; and transmit the precoder matrix indicators.

According to a further aspect of embodiments herein, the object is achieved by a method performed by a base station of enabling a User Equipment, UE, to determine a precoder codebook in a wireless communication system. The base station generates precoder parameters associated with a plurality of antenna ports of the base station. The precoder parameters comprise a parameter that specifies a number Nh of antenna ports in a first dimension and a parameter that specifies a number Nv of antenna ports in a second dimension. The plurality of antenna ports comprises a number NT of antenna ports that is a function of Nh and Nv. The base station transmits to the UE, information regarding the precoder parameters enabling the UE to determine the precoder codebook.

According to a yet further aspect of embodiments herein, the object is achieved by a method performed by a User Equipment, UE, of determining a precoder codebook in a wireless communication system. The UE receives information regarding precoder parameters from a base station. The precoder parameters are associated with a plurality of antenna ports of the base station. The precoder parameters comprise a parameter that specifies a number Nh of antenna ports in a first dimension; and a parameter that specifies a number Nv of antenna ports in a second dimension. The plurality of antenna ports comprises a number NT of antenna ports that is a function of Nh and Nv. The UE then determines a precoder codebook based on the received information regarding the precoder parameters.

According to a further aspect of embodiments herein, the object is achieved by a base station for enabling a User Equipment, UE, to determine a precoder codebook in a wireless communication system. The base station being operative to:
  Generate precoder parameters associated with a plurality of antenna ports of the base station 110. The precoder parameters comprise a parameter that specifies a number Nh of antenna ports in a first dimension and a parameter that specifies a number Nv of antenna ports in a second dimension. The plurality of antenna ports comprises a number NT of antenna ports that is a function of Nh and Nv.
  Transmit to the UE, information regarding the precoder parameters enabling the UE to determine the precoder codebook.

According to a yet further aspect of embodiments herein, the object is achieved by a User Equipment, UE, for determining a precoder codebook in a wireless communication system, the UE being operative to:
  Receive information regarding precoder parameters from a base station. The precoder parameters are associated with a plurality of antenna ports of the base station. The precoder parameters comprise a parameter that specifies a number Nh of antenna ports in a first dimension; and a parameter that specifies a number Nv of antenna ports in a second dimension. The plurality of antenna ports comprises a number NT of antenna ports that is a function of Nh and Nv.
  Determine the precoder codebook based on the received information regarding the precoder parameters.

Embodiments herein may comprise the following:

Embodiment 1

A method of selecting a precoder matrix for spatial multiplexing in a wireless communication system, the method comprising:

generating, at a base station, precoder parameters associated with a plurality of antennas of the base station; and transmitting from the base station to a user equipment, UE, the precoder parameters enabling the UE to generate a precoder codebook.

Embodiment 2

The method of Embodiment 1, wherein the precoder parameters include:
  a number Nh that specifies a number of antennas in a first dimension of an array of antenna elements; and
  a number Nv that specifies a number of antennas in a second dimension of the array of antenna elements.

Embodiment 3

The method of Embodiment 2, wherein one of Nv and Nh is one.

Embodiment 4

The method of Embodiment 2, wherein the precoder parameters include:
  a number of beams Mh available in the first dimension; and
  a number of beams Mv available in the second dimension.

Embodiment 5

The method of Embodiment 4, wherein the parameters Mh and Mv are expressible in terms of corresponding oversampling factors Qh and Qv, respectively.

Embodiment 6

The method of Embodiment 1, further comprising:
  receiving at the base station from the UE, at least one precoder matrix indicator indicating at least one precoder matrix selected by the UE;
  generating the at least one precoder matrix;
  utilizing the generated at least one precoder matrix to form beams.

Embodiment 7

A method of selecting a precoder matrix for spatial multiplexing in a wireless communication system, the method comprising:
  receiving from a base station at a user equipment, UE, at least one precoder parameter;
  generating a precoder codebook based on the received at least one precoder parameter.

Embodiment 8

The method of Embodiment 7, further comprising:
  selecting a particular precoder matrix from the generated precoder codebook based on a measure of performance associated with the particular precoder matrix; and
  transmitting a precoder matrix indicator, PMI, to the base station, the PMI corresponding to the selected precoder matrix.

Embodiment 9

The method of Embodiment 8, wherein selecting a particular precoder matrix includes:

selecting a first precoder matrix factor associated with a first dimension; and
selecting a second precoder matrix factor associated with a second dimension.

Embodiment 10

The method of Embodiment 9, wherein selecting a particular precoder matrix further includes selecting a third precoder matrix factor that is frequency-dependent.

Embodiment 11

The method of Embodiment 1, wherein the third precoder matrix factor includes selection vectors for selecting a particular one of a plurality of beams.

Embodiment 12

A base station operative to:
store precoder parameters and precoder matrix indicators received from a user equipment, UE;
select a set of precoder parameters to enable the UE to generate a precoder codebook; and
generate a precoder matrix based on the precoder matrix indicators received from the UE.

Embodiment 13

The base station of Embodiment 12, wherein the precoder matrix indicators include:
a first matrix indicator that indicates a first matrix associated with a first dimension of an antenna array; and
a second matrix indicator that indicates a second matrix associated with a second dimension of the antenna array.

Embodiment 14

The base station of Embodiment 13, wherein the precoder matrix indicators further include a third matrix indicator that indicates a third matrix that is frequency-dependent.

Embodiment 15

The base station of Embodiment 12, wherein the base station includes:
a memory configured to store the precoder parameters and precoder matrix indicators;
a processor configured to:
select the precoder parameters; and
generate the precoder matrix; and
a transceiver configured to:
transmit the precoder parameters; and
receive the precoder matrix indicators.

Embodiment 16

A user equipment operative to:
store:
precoder parameters received from a base station;
precoder matrix indicators; and performance parameters; and
generate a precoder codebook based on the precoder parameters received from the base station;
determine performance obtained from each of a plurality of precoder matrices selected from the precoder codebook; and
select precoder matrix indicators based on the performance parameters.

Embodiment 17

The user equipment of Embodiment 16, further comprising a transceiver module configured to transmit a first precoder matrix indicator associated with a first dimension at a first periodicity and to transmit a second precoder matrix indicator associated with a second dimension with a second periodicity different from the first periodicity.

Embodiment 18

The user equipment of Embodiment 16, wherein the precoder codebook generation module is configured to generate a discrete Fourier transform, DFT, based codebook.

Embodiment 19

The user equipment of Embodiment 18, wherein a first DFT codebook is generated for a first dimension, and a second DFT codebook is generated for a second dimension orthogonal to the first dimension.

Embodiment 20

The user equipment of claim 16, wherein the user equipment comprises:
a memory configured to store the precoder parameters, the precoder matrix indicators, and the performance parameters;
a processor configured to:
generate the precoder codebook;
determine the performance; and
select precoder matrix indicators; and
a transceiver configured to:
receive the precoder parameters; and
transmit the precoder matrix indicators

What is claimed is:
1. A method performed by a base station of enabling a User Equipment (UE) to determine a precoder codebook in a wireless communication system, the method comprising:
transmitting, to the UE, values of precoder parameters enabling the UE to determine the precoder codebook based on a parameter-based codebook, wherein the precoder parameters are associated with a plurality of antenna ports of the base station, wherein the number of the plurality of antenna ports is a function of a number of antenna ports in a first dimension and a number of antenna ports in a second dimension, and wherein the precoder parameters specify the number of antenna ports and an oversampling factor in the first dimension and specify the number of antenna ports and an oversampling factor in the second dimension.
2. A method performed by a User Equipment (UE) of determining a precoder codebook in a wireless communication system, the method comprising:
receiving, from a base station, values of precoder parameters enabling the UE to determine the precoder codebook, wherein the precoder parameters are associated with a plurality of antenna ports of the base station, wherein the number of the plurality of antenna ports is a function of a number of antenna ports in a first dimension and a number of antenna ports in a second dimension, and wherein the precoder parameters specify the number of antenna ports and an oversam- pling factor in the first dimension and specify the number of antenna ports and an oversampling factor in the second dimension; and determining the precoder codebook based on the received values of the precoder parameters and a parameter-based codebook.

3. A base station for enabling a User Equipment (UE) to determine a precoder codebook in a wireless communication system, the base station comprising:
a transceiver;
a processor, operatively coupled to the transceiver; and
a memory, operatively coupled to the processor and comprising instructions for execution by the processor, said instructions being configured to, upon execution by the processor, cause the base station to:
transmit, to the UE, values of precoder parameters enabling the UE to determine the precoder codebook based on a parameter-based codebook, wherein the precoder parameters are associated with a plurality of antenna ports of the base station, wherein the number of the plurality of antenna ports is a function of a number of antenna ports in a first dimension and a number of antenna ports in a second dimension, and wherein the precoder parameters specify the number of antenna ports and an oversampling factor in the first dimension and specify the number of antenna ports and an oversampling factor in the second dimension.

4. The base station of claim 3, wherein the precoder parameters further specify:
a number of beams available in the first dimension and a number of beams available in the second dimension.

5. The base station of claim 4, wherein the number of beams available in the first dimension and the number of beams available in the second dimension are dependent on corresponding oversampling factors in the first and second dimensions, respectively.

6. The base station of claim 3, wherein the instructions are further configured to cause the base station to:
determine the precoder codebook based on the values of the precoder parameters and the parameter-based codebook.

7. The base station of claim 3, wherein a precoder in the precoder codebook is constructed or generated by combining a precoder matrix in the first dimension and a precoder matrix in the second dimension in a way equivalent to using a Kronecker product.

8. The base station of claim 3, wherein either the number of antenna ports in the first dimension or the number of antenna ports in the second dimension is equal to one.

9. The base station of claim 3, wherein the number of the plurality of antenna ports is equal to the number of antenna ports in the first dimension times the number of antenna ports in the second dimension times a number of different polarizations.

10. The base station of claim 3, wherein the instructions are further configured to, upon execution by the processor, cause the base station to:
receive, from the UE, at least one Precoder Matrix Indicator (PMI) indicating at least one precoder matrix selected by the UE;
generate the indicated at least one precoder matrix based on the at least one PMI; and
utilize the indicated at least one precoder matrix to form beams for transmission to the UE.

11. The base station of claim 10, wherein the at least one PMI comprises:

a first precoder matrix indicator that indicates a first precoder matrix associated with the first dimension; and
a second precoder matrix indicator that indicates a second precoder matrix associated with the second dimension.

12. A User Equipment (UE) for determining a precoder codebook in a wireless communication system, the UE comprising:
a transceiver;
a processor, operatively coupled to the transceiver; and
a memory, operatively coupled to the processor and comprising instructions for execution by the processor, said instructions being configured to, upon execution by the processor, cause the UE to:
receive, from a base station, values of precoder parameters enabling the UE to determine the precoder codebook, wherein the precoder parameters are associated with a plurality of antenna ports of the base station, wherein the number of the plurality of antenna ports is a function of a number of antenna ports in a first dimension and a number of antenna ports in a second dimension, and wherein the precoder parameters specify the number of antenna ports and an oversampling factor in the first dimension and specify the number of antenna ports and an oversampling factor in the second dimension, and
determine the precoder codebook based on the received values of the precoder parameters and a parameter-based codebook.

13. The UE of claim 12, wherein the precoder parameters further specify:
a number of beams available in the first dimension and a number of beams available in the second dimension.

14. The UE of claim 12, wherein a precoder in the determined precoder codebook is constructed or generated by combining a precoder matrix in the first dimension and a precoder matrix in the second dimension in a way equivalent to using a Kronecker product.

15. The UE of claim 12, wherein the instructions are further configured to, upon execution by the processor, cause the UE to:
select at least one precoder matrix from the determined precoder codebook based on a measure of performance associated with the at least one precoder matrix; and
transmit at least one Precoder Matrix Indicator (PMI) to the base station, the at least one PMI corresponding to the selected at least one precoder matrix.

16. The UE of claim 15, wherein the instructions are further configured to, upon execution by the processor, cause the UE to transmit the at least one PMI to the base station, by transmitting a first precoder matrix indicator associated with the first dimension at a first periodicity, and transmitting a second precoder matrix indicator associated with the second dimension at a second periodicity different from the first periodicity.

17. The UE of claim 15, wherein the instructions are further configured to, upon execution by the processor, cause the UE to select the at least one precoder matrix from the determined precoder codebook by:
selecting a first precoder matrix factor associated with the first dimension; and
selecting a second precoder matrix factor associated with the second dimension.

18. The UE of claim 17, wherein the instructions are further configured to, upon execution by the processor, cause the UE to select the at least one precoder matrix by further selecting a third precoder matrix factor that is frequency-dependent.

19. The UE of claim 18, wherein the third precoder matrix factor comprises selection vectors for selecting a particular one of a plurality of beams.

20. The UE of claim 12, wherein the determined precoder codebook is a Discrete Fourier Transform (DFT) based codebook.

21. The UE of claim 20, wherein the DFT based codebook comprises a first DFT based codebook for the first dimension, and a second DFT based codebook for the second dimension, and wherein the second dimension is orthogonal to the first dimension.

* * * * *

UNITED STATES PATENT AND TRADEMARK OFFICE
CERTIFICATE OF CORRECTION

PATENT NO. : 10,581,498 B2
APPLICATION NO. : 16/203227
DATED : March 3, 2020
INVENTOR(S) : Jöngren et al.

It is certified that error appears in the above-identified patent and that said Letters Patent is hereby corrected as shown below:

In the Specification

In Column 5, Line 22, delete "My" and insert -- Mv --, therefor.

In Column 8, Line 43, delete "My" and insert -- Mv --, therefor.

In Column 9, Line 26, delete "My" and insert -- Mv --, therefor.

In Column 11, Line 36, delete "w," and insert -- $W_2$, --, therefor.

In Column 13, Line 55, delete "PMI 1." and insert -- PMI l. --, therefor.

In Column 14, Line 7, delete "w" and insert -- W --, therefor.

In Column 15, Line 51, delete "polarizations w." and insert -- polarizations ω. --, therefor.

In Column 18, Line 36, delete "My" and insert -- Mv --, therefor.

In Column 19, Line 23, delete "My" and insert -- Mv --, therefor.

In Column 20, Line 53, delete "My" and insert -- Mv --, therefor.

In Column 24, Line 27, delete "My" and insert -- Mv --, therefor.

In Column 24, Line 31, delete "My" and insert -- Mv --, therefor.

Signed and Sealed this
First Day of September, 2020

Andrei Iancu
*Director of the United States Patent and Trademark Office*